US012570043B2

(12) United States Patent
Binek et al.

(10) Patent No.: US 12,570,043 B2
(45) Date of Patent: Mar. 10, 2026

(54) POWDER BED FUSION RECOATER ASSEMBLY

(71) Applicant: RTX Corporation, Farmington, CT (US)

(72) Inventors: Lawrence A. Binek, Glastonbury, CT (US); Joseph E. Ott, Enfield, CT (US); Dean R. Sirois, Enfield, CT (US)

(73) Assignee: RTX CORPORATION, Farmington, CT (US)

( * ) Notice: Subject to any disclaimer, the term of this patent is extended or adjusted under 35 U.S.C. 154(b) by 28 days.

(21) Appl. No.: 18/227,666

(22) Filed: Jul. 28, 2023

(65) Prior Publication Data

US 2025/0033280 A1    Jan. 30, 2025

(51) Int. Cl.
| | |
|---|---|
| *B29C 64/214* | (2017.01) |
| *B29C 64/153* | (2017.01) |
| *B29C 64/268* | (2017.01) |
| *B33Y 10/00* | (2015.01) |
| *B33Y 30/00* | (2015.01) |

(52) U.S. Cl.
CPC .......... B29C 64/214 (2017.08); B29C 64/153 (2017.08); B29C 64/268 (2017.08); *B33Y 10/00* (2014.12); *B33Y 30/00* (2014.12)

(58) Field of Classification Search
CPC .......... B22F 10/30; B22F 12/90; B22F 12/67; B29C 64/386; B29C 64/393; B29C 33/74; B29C 64/205; B29C 64/214; B33Y 50/00; B33Y 50/02
See application file for complete search history.

(56) References Cited

U.S. PATENT DOCUMENTS

| | | | |
|---|---|---|---|
| 10,960,607 | B2 | 3/2021 | Ostroverkhov et al. |
| 11,167,454 | B2 | 11/2021 | Rockstroh et al. |
| 11,279,086 | B2 | 3/2022 | Norman |
| 11,312,072 | B2 | 4/2022 | Deforge et al. |
| 2016/0121397 | A1* | 5/2016 | Aydin ..................... B22F 12/67 |
| | | | 118/708 |
| 2017/0334087 | A1 | 11/2017 | Gass |
| 2018/0236549 | A1 | 8/2018 | Spears et al. |
| 2021/0031447 | A1* | 2/2021 | Deforge ............... B29C 64/153 |
| 2022/0143704 | A1 | 5/2022 | Tran et al. |

FOREIGN PATENT DOCUMENTS

| | | | |
|---|---|---|---|
| CN | 116423832 A | 7/2023 | |
| DE | 102015107179 A1 | 11/2016 | |
| EP | 2988893 B1 | 12/2018 | |
| EP | 3689503 A1 * | 8/2020 | .............. B22F 10/00 |

OTHER PUBLICATIONS

Extended European Search Report for EP Application No. 24191287.2, Dated Jan. 14, 2025, pp. 13.

* cited by examiner

*Primary Examiner* — Philip C Tucker
*Assistant Examiner* — Jimmy R Smith, Jr.
(74) *Attorney, Agent, or Firm* — Kinney & Lange, P.A.

(57) ABSTRACT

A recoater assembly for an additive manufacturing (AM) machine includes a recoater blade magazine, an optical transmitter associated with the recoater blade magazine, an optical sensor positioned to receive a light beam transmitted from the optical transmitter as the optical transmitter tracks the path of the primary recoater blade over the build powder bed, a controller configured to receive the failure signal transmitted from the optical sensor to the controller, a recoater blade disengagement mechanism, and a recoater blade compression mechanism positioned in the recoater blade magazine.

19 Claims, 3 Drawing Sheets

POWDER BED FUSION RECOATER ASSEMBLY

BACKGROUND

The present disclosure relates generally to laser powder bed fusion additive machines and, more particularly, to a recoater assembly for a laser powder bed fusion additive machine.

Laser powder bed fusion (PBF-LB) additive manufacturing is an additive manufacturing, or 3-D printing, technology that uses a laser to sinter or fuse metallic or polymeric particles together in a layer-by-layer process. PBF-LB is typically used as an industrial process to make near net shape parts. Some PBF-LB processes sinter the build powder particles, while others melt and fuse the build powder particles. PBF-LB is also known as direct metal laser sintering (DMLS).

PBF-LB additive manufacturing machines rely on a powder coater to distribute fresh build powder onto a build powder bed during a build campaign. The powder coater is supplemented by a recoater assembly that creates an even distribution of build powder on the build powder bed. Recoater assemblies contain a blade, which may be hard (e.g., tool steel or ceramic) or soft (e.g., a brush, or elastomer, such as a rubber or a polyurethane material). The difference in recoater blade material impacts build performance as softer blades are more distortion tolerant, whereas hard blades may provide a smoother surface, which can lead to better surface roughness in parts made on the PBF-LB additive manufacturing machine. As the recoater blade degrades through use, it may cause build issues. Damaged recoater blade material can settle in the build powder bed and contaminate one or more build powder layers. If a section of the recoater blade has been eroded or chipped, it will distribute an uneven build powder layer which can result in defects in the parts made from that build powder bed.

SUMMARY

One aspect of this disclosure is directed to a recoater assembly for an additive manufacturing (AM) machine that includes a recoater blade magazine, an optical transmitter associated with the recoater blade magazine, an optical sensor positioned to receive a light beam transmitted from the optical transmitter as the optical transmitter tracks the path of the primary recoater blade over the build powder bed, a controller configured to receive the failure signal transmitted from the optical sensor to the controller, a recoater blade disengagement mechanism, and a recoater blade compression mechanism positioned in the recoater blade magazine. The recoater blade magazine is configured to contain a primary recoater blade and at least one replacement recoater blade and is further configured to traverse across a build powder bed on the AM machine to distribute, with the primary recoater blade, build powder across the build powder bed. The optical transmitter is configured to track a path of the primary recoater blade over the build powder bed. If the optical sensor detects that the light beam transmitted from the optical transmitter is obscured or interrupted, the optical sensor is configured to generate a failure signal indicating primary recoater blade failure. The controller is configured to command the recoater blade magazine and primary recoater blade to return to a recoater blade magazine starting position. The recoater blade disengagement mechanism configured to engage with the primary recoater blade retention mechanism to cause the primary recoater blade to eject from the recoater blade magazine into a recoater blade receptacle. The recoater blade compression mechanism is configured to urge a replacement recoater blade to descend in the recoater blade magazine to engage with the primary recoater blade retention mechanism whereby the replacement recoater blade becomes the primary recoater.

Another aspect of the disclosure is directed to a method of operating an additive manufacturing (AM) machine having a recoater assembly. The recoater assembly traverses across a build powder bed on the AM machine to distribute, with a primary recoater blade positioned in the recoater assembly, build powder across the build powder bed. An optical transmitter associated with the recoater assembly tracks a path of the primary recoater blade over the build powder bed. The optical transmitter transmits a light beam to an optical sensor as the optical transmitter tracks the path of the primary recoater blade over the build powder bed. The optical sensor is configured to generate a failure signal indicating primary recoater blade failure if the sensor detects that the light beam transmitted from the optical transmitter is obscured or interrupted. The optical sensor transmits the failure signal to a controller, which is configured to command the recoater blade magazine and primary recoater blade to return to a recoater blade magazine starting position upon receipt of the failure signal. The recoater blade magazine and primary recoater blade returns to the recoater blade magazine starting position upon receipt of the return command from the controller. A recoater blade disengagement mechanism engages with the primary recoater blade retention mechanism to cause the primary recoater blade to eject from the recoater blade magazine into a recoater blade receptacle. A recoater blade compression mechanism positioned in the recoater blade magazine urges a replacement recoater blade to descend in the recoater blade magazine to engage with the primary recoater blade retention mechanism, whereby the replacement recoater blade becomes the primary recoater.

DETAILED DESCRIPTION

Laser powder bed fusion (PBF-LB) additive manufacturing and the similar electron beam powder bed fusion (PBF-EB) additive manufacturing process are options to make near net shape parts. PBF-LB and PBF-EB machines include a recoater assembly to create an even distribution of build powder on the build powder bed to facilitate effective fabrication of parts. Recoater assemblies include a blade to distribute the build powder. The recoater blade can degrade through use to the point that it may cause build issues. For example, damaged recoater blade material can settle in the build powder bed and contaminate one or more build powder layers. If a section of the recoater blade has been eroded or chipped, it can create an uneven build powder layer, which can result in defects in the parts made from that build powder bed. In a production environment, recoater blade damage generally leads to a build campaign pause to change the recoater blade. Pausing the operation of the PBF-LB/PBF-EB machine for a recoater blade change can form a witness line in the parts being built on the PBF-LB/PBF-EB machine which may not be desirable and therefore causing parts from the build campaign to be scrapped.

The present disclosure is directed to a recoater assembly that permits a damaged recoater blade to be changed quickly without interrupting a build campaign. The disclosed recoater assembly avoids the formation of witness lines and other defects associated with interrupting a build campaign. For simplicity, the disclosed recoater assembly will be discussed in the context of a PBF-LB machine, but it should be recognized that the disclosed recoater assembly is equally applicable to PBF-EB machines and similar AM machines that use a recoater assembly.

Figure 1:
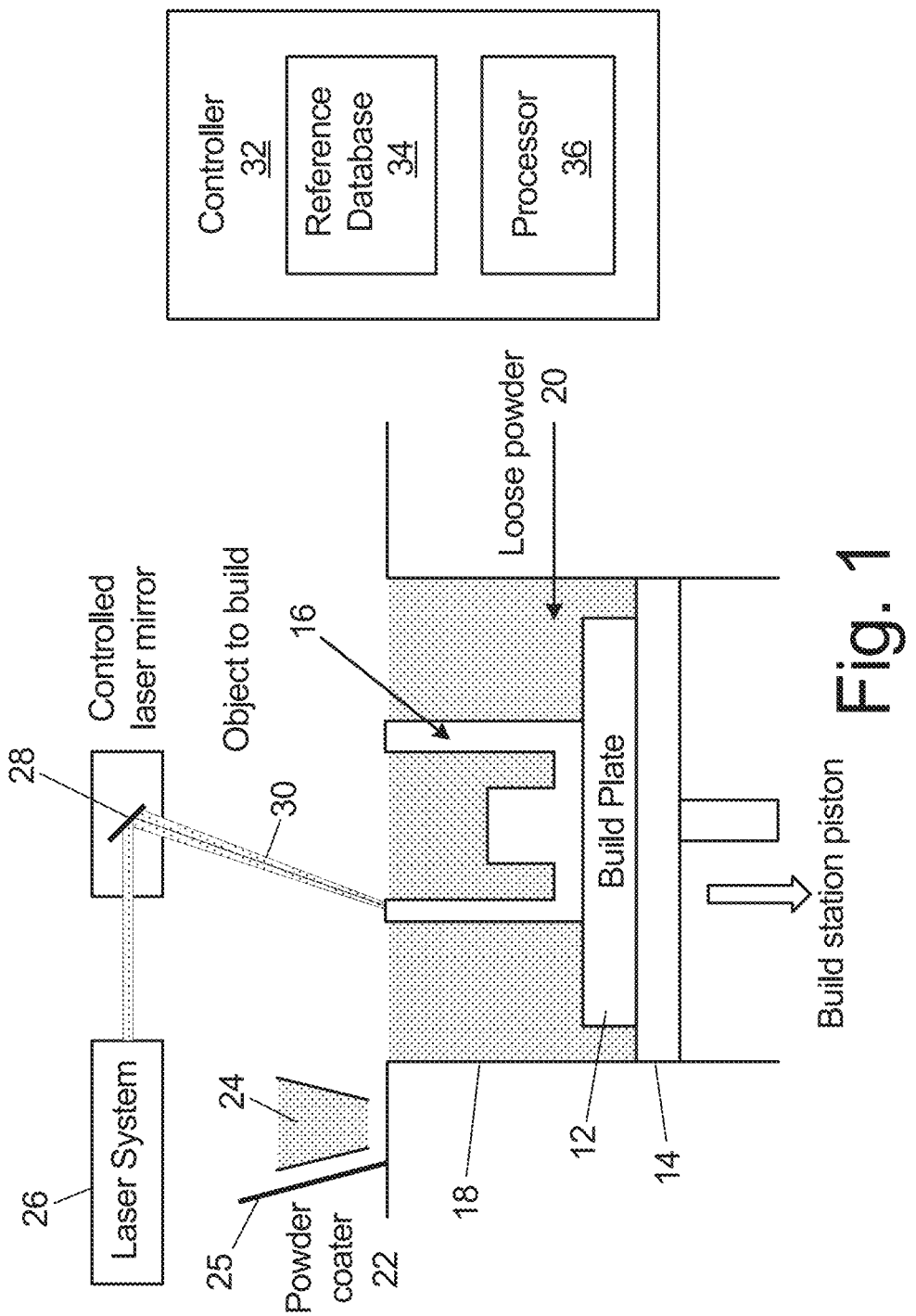
FIG. 1 is a schematic of an exemplary laser powder bed fusion (PBF-LB) additive manufacturing system.

FIG. 1 is a schematic of an exemplary, non-limiting PBF-LB system 10. A typical PBF-LB system 10 includes a build plate 12, a build station piston 14 that adjusts the height of the build plate 12, a part or part 16 that is built on top of the build plate 12, a powder chamber 18 to contain loose, and unconsolidated build powder 20 that surrounds the part 16. A typical PBF-LB system 10 also includes a powder coater 22 that distributes additional build powder 24 over the part 16 after completion of each layer formed on the part 16. A recoater blade 25 follows the powder coater 22 as it distributes additional build powder 24 to create a smooth layer of consolidated built powder 20. The recoater blade 25 can be made from silicone, polyurethane, rubber, or other elastomeric materials. A laser system 26 combined with a controlled laser mirror 28 directs a laser beam 30 onto loose build powder 20 to form a melt pool (not shown) that, when solidified, forms a layer of the part 16. As each layer of the part 16 is formed, the build station piston 14 lowers the built plate 12 and part 16 by a predetermined distance that corresponds to the desired thickness of the next layer of the part 16. The powder coater 22 then moves across the top of the loose build powder 20 to distribute a layer of additional build powder 24 that will then be consolidated with the laser beam 30 to form the next layer of the part 16.

Controller 32 controls the height of the build plate 12 by moving the build station piston 14, which in turn controls the thickness of each layer of the part 16. Controller 32 also controls the movement of the powder coater 22 as it distributes additional build powder 24 and the movement of the laser beam 30 as it forms the melt pool that consolidates loose build powder 20 to form each layer of the part 16. For example, the controller 32 controls PBF-LB system 10 operating parameters, including:

(1) laser beam power, laser beam velocity, and laser beam spot size, build plate temperature, and layer thickness;

(2) temperature-dependent thermophysical properties of the powder;

(3) feedstock properties including average powder particle size; and (4) laser hatching strategy including hatch distance, hatch delay time, and stripe width.

Controller 32 typically includes a reference database 34 and processor 36. Reference database 34 contains processing data relevant to the PBF-LB system 10, build powder to be used to produce the part 16, and the specific work piece 16 to be produced. Processor 36 contains programming to interface with the reference database 34 to control the PBF-LB system 10 to products parts, such as part 16, as is known to a person of ordinary skill in the art. Part 16 can be a near-net-shaped part (i.e., initial production of the part that is very close to the final (net) shape).

The PBF-LB system 10 can be used with a variety of build powders to produce part 24. For example, the powder can be a metal powder or polymeric powder. Metallic powders compatible with typical PBF-LB systems 10 include aluminum, aluminum alloys (e.g., aluminum-lithium alloys), titanium, nickel, nickel alloys, and other metals and alloys known in the art. Polymeric powders compatible with typical PBF-LB systems 10 include a wide variety of polymers as known in the art.

Figure 2:
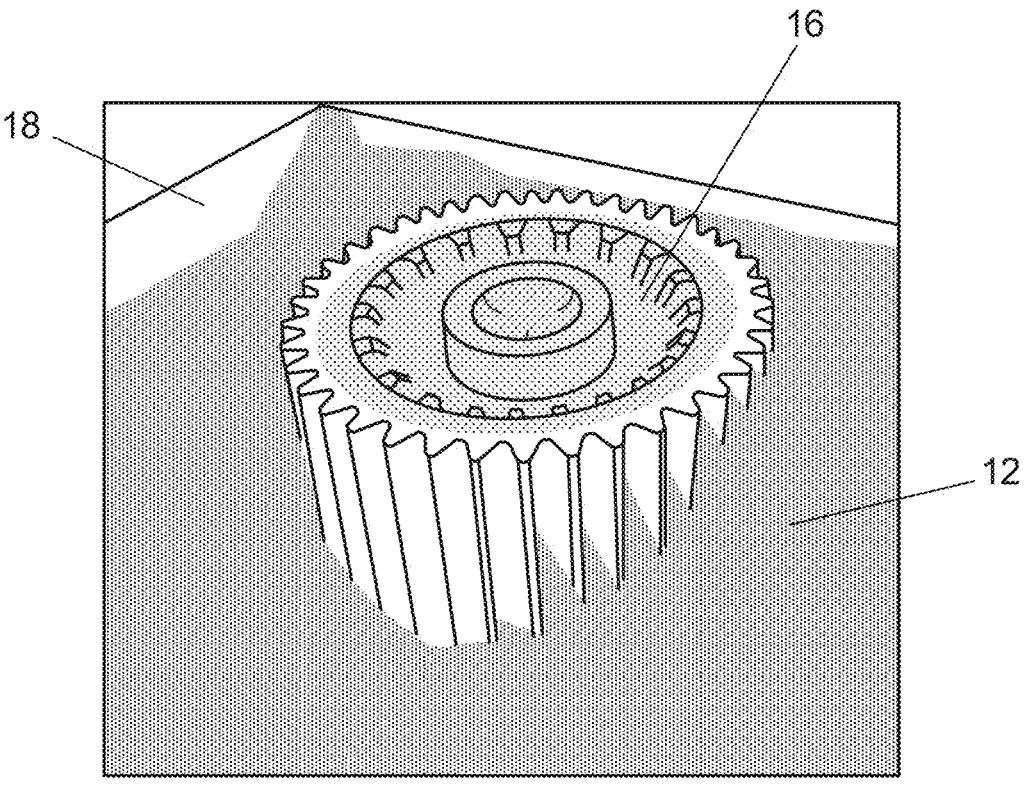
FIG. 2 is a photograph of a part made on PBF-LB system.

FIG. 2 is a photograph of a part 16 made on PBF-LB system 10. FIG. 2 also shows powder chamber 18 that contains loose and unconsolidated build powder 20 remaining after the build operation used to make part 16.

Figure 3:
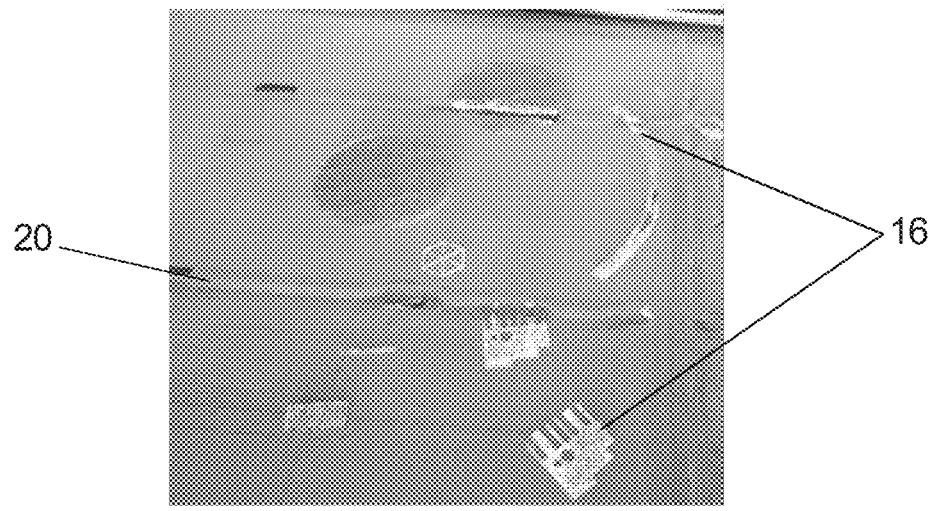
FIG. 3 is a photograph showing layers of unconsolidated powder associated with a recoater blade that has been damaged due to contact with parts made on PBF-LB system.

FIG. 3 is a photograph showing layers of unconsolidated powder 20 associated with a recoater blade 25 that has been damaged due to contact with parts 16 during operation of the recoater blade 25. In addition, contact between the recoater blade 25 and parts 16 can damage or distort the parts 16, as seen in FIG. 3. The type of damage shown in FIG. 3 and similar types of damage can result in an unsuccessful build campaign in which parts 16 are scrapped and the recoater blade 25 or higher level assembly can be damaged.

Figure 4:
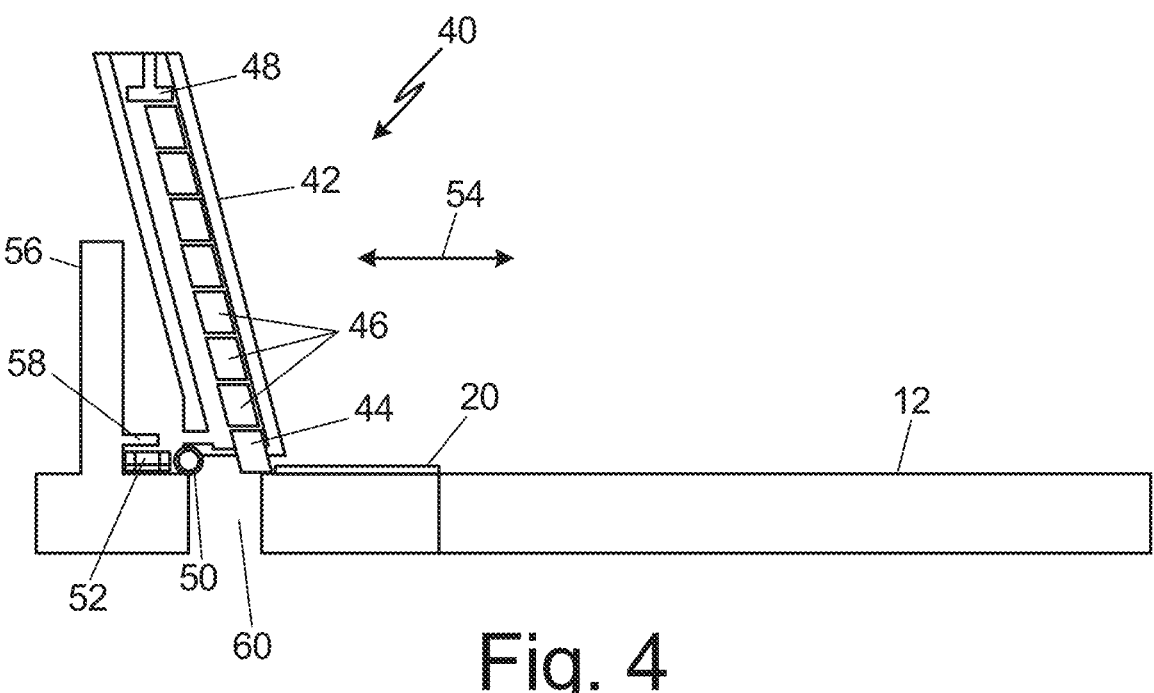
FIG. 4 is a schematic of a recoater assembly of the present disclosure.

FIG. 4 is a schematic of a recoater assembly 40 of the present disclosure. A recoater magazine 42 contains a plurality of recoater blades 44, 46 stacked upon each other and held in place using a recoater blade compression mechanism 48, shown in FIG. 4 as a spring mechanism, namely a spring-loaded push plate. It should be recognized that the disclosed recoater blade compression mechanism 48 can be any device that functions to provide a suitable compressive force on the plurality of recoater blades 44, 46 in the recoater magazine 42. The primary recoater blade 44 is positioned closest to the build plate 12 and is the "active" recoater blade used to distribute build powder in the build powder bed 20. The recoater magazine 42 is configured to accommodate at least one replacement recoater blade 46 stacked on top of the primary coater blade 44. The primary recoater blade 44 is held in place in the recoater magazine 42 with a recoater blade retention mechanism (not shown). The recoater blade retention mechanism can be detents (not shown) that hold the recoater blades 44, 46 in place or any other structure suitable for retaining the recoater blades 44, 46 in the recoater magazine 42.

The recoater assembly 40 includes an optical transmitter 50 and an optical sensor 52 located behind the primary recoater blade 44. The optical transmitter 50 and optical sensor 52 can be arranged parallel to the travel 54 of the recoater assembly 40 across the build powder bed 20. The optical transmitter 50 may be attached to and even, in some examples, integral with the recoater magazine 42 or may be located in another location where the optical transmitter 50 can track the path of the primary recoater blade 44 over the build powder bed 20 on the build plate 12. The optical sensor 52 should be positioned to receive a light beam transmitted from the optical transmitter 50 as the optical transmitter 50 travels with the primary recoater blade 44 over the build powder bed 20, as long as the view from the optical transmitter 50 to the optical sensor 52 is unobstructed. Under normal circumstances, the optical transmitter 50 traverses the entire build powder bed 20 with the primary recoater blade 42 uninterrupted while maintaining a continuous, unobstructed transmission of the light beam to the optical sensor 52.

The optical transmitter 50 can be any optical device capable of transmitting a light beam of any useful wavelength that is capable of being transmitted from the optical transmitter 50 the optical sensor 52. For example, the optical transmitter 50 may be a laser, a light emitting diode (LED), or other optical transmission device. Depending on the capabilities of the optical transmitter 50 and requirements of a specific application, the optical transmitter 50 may transmit a highly coherent light beam, such as a laser beam, a columnated light beam, or a non-columnated light beam. Similarly, the optical sensor 52 can be any optical sensing device capable of receiving the light beam transmitted by the optical transmitter 50 and generating an electrical response to receipt of the light beam. A person of ordinary skill will know how to select a combination of optical transmitter 50, light beam, and optical sensor 52 appropriate for a particular application.

During a damage event, such as the primary recoater blade 44 making contact with one or more parts 16 being built during a build campaign, the primary recoater blade 44 can be damaged, for example by chipping, ripping, fracturing, etc. Other types of damage event can cause similar damage to the primary recoater blade 44. Damage to the primary recoater blade 44 can create streaks and/or linear ridges in the build powder bed 20 where the primary recoater blade 44 does not spread build powder evenly. The streaks and/or linear ridges in the build powder bed 20 will obscure or interrupt the light beam transmitted between the optical transmitter 50, positioned behind the primary recoater blade 44, and the optical sensor 52 indicating an aberration in the build powder bed 20. When the optical sensor 52 detects that the light beam transmitted from the optical transmitter 50 has been obscured or interrupted, the optical sensor 52 generates a failure signal indicating primary recoater blade 44 failure. This failure signal from the optical sensor 52 is transmitted to the controller 32 to cause the controller 32 (see FIG. 1) to command the recoater magazine 40 and primary recoater blade 44 to return to a recoater blade magazine starting point 56, shown in FIG. 4 as an arrestor bulkhead. It should be recognized that the disclosed recoater blade magazine starting point 56 can be any device or structure that functions to provide a suitable starting or "neutral" point for the recoater blade magazine 42.

As the recoater magazine 40 approaches the recoater blade magazine starting point 56, a recoater blade disengagement mechanism 58, shown in FIG. 4 as an arrestor pin, engages with the primary recoater blade retention mechanism to cause the damaged primary recoater blade 44 to eject into a recoater blade receptacle 60 and a replacement recoater blade 46 to descend into its place as urged by the recoater blade compression mechanism 48. It should be recognized that the disclosed recoater blade disengagement mechanism 58 can be any device or structure that functions to provide a suitable disengagement mechanism to cause the damaged primary recoater blade 44 to eject into a recoater blade receptacle 60. Once the replacement recoater blade 46 engages with the primary recoater blade retention mechanism, the replacement recoater blade 46 becomes the new primary recoater blade 44 and the recoater assembly 40 resumes operation with without the need to power-down the AM machine and without generating witness lines in the parts 16 that are part of the build campaign.

The disclosed recoater assembly 40 permits build campaigns on the AM machine (e.g., PBF-LB or PBF-EB machine) to continue with little to no interruption and little to no disruption (e.g., witness lines) in the parts 16 that are part of the build campaign. This result may be particularly important for build campaigns for a large number of parts (e.g., up to 300 or more parts) or for geometrically large parts. Such build campaigns can last for extended periods (e.g., 30 or more days) to complete successfully.

Discussion of Possible Embodiments

The following are non-exclusive descriptions of possible embodiments of the present invention.

A recoater assembly for an additive manufacturing (AM) machine comprising a recoater blade magazine configured to contain a primary recoater blade and at least one replacement recoater blade, wherein the recoater blade magazine is further configured to traverse across a build powder bed on the AM machine to distribute, with the primary recoater blade, build powder across the build powder bed. An optical transmitter is associated with the recoater blade magazine, wherein the optical transmitter is configured to track a path of the primary recoater blade over the build powder bed. An optical sensor is positioned to receive a light beam transmitted from the optical transmitter as the optical transmitter tracks the path of the primary recoater blade over the build powder bed, wherein if the optical sensor detects that the light beam transmitted from the optical transmitter is obscured or interrupted the optical sensor is configured to generate a failure signal indicating primary recoater blade failure. A controller is configured to receive the failure signal transmitted from the optical sensor to the controller, wherein the controller is configured to command the recoater blade magazine and primary recoater blade to return to a recoater blade magazine starting position. A recoater blade disengagement mechanism is configured to engage with the primary recoater blade retention mechanism to cause the primary recoater blade to eject from the recoater blade magazine into a recoater blade receptacle. A recoater blade compression mechanism is positioned in the recoater blade magazine, wherein the recoater blade compression mechanism is configured to urge a replacement recoater blade to descend in the recoater blade magazine to engage with the primary recoater blade retention mechanism whereby the replacement recoater blade becomes the primary recoater.

The recoater assembly of the preceding paragraph can optionally include, additionally and/or alternatively, any one or more of the following features, configurations and/or additional elements:

The recoater assembly of the preceding paragraph, optionally wherein the optical transmitter is positioned on the recoater blade magazine.

The recoater assembly of any of the preceding paragraphs, optionally the optical sensor is positioned on an arrestor bulkhead.

The recoater assembly of any of the preceding paragraphs, wherein the recoater blade disengagement mechanism comprises an arrestor pin positioned on an arrestor bulkhead and wherein the arrestor bulkhead defines the recoater blade magazine starting position.

The recoater assembly of any of the preceding paragraphs, wherein the recoater blade compression mechanism comprises a spring mechanism.

The recoater assembly of any of the preceding paragraphs, wherein the optical transmitter is a laser configured to transmit a laser beam.

The recoater assembly of any of the preceding paragraphs, wherein the optical transmitter is a light emitting diode configured to transmit a columnated light beam.

The recoater assembly of any of the preceding paragraphs, wherein the AM machine is a laser powder bed AM machine.

The recoater assembly of any of the preceding paragraphs, wherein the AM machine is an electron beam powder bed AM machine.

A method of operating an additive manufacturing (AM) machine having a recoater assembly, comprises traversing the recoater assembly across a build powder bed on the AM machine to distribute, with a primary recoater blade positioned in the recoater assembly, build powder across the build powder bed. An optical transmitter associated with the recoater assembly tracks a path of the primary recoater blade over the build powder bed. The optical transmitter transmits a light beam to an optical sensor as the optical transmitter tracks the path of the primary recoater blade over the build powder bed, wherein the optical sensor is configured to generate a failure signal indicating primary recoater blade failure if the optical sensor detects that the light beam transmitted from the optical transmitter is obscured or interrupted. The optical sensor transmits the failure signal to a controller, wherein the controller is configured to command the recoater blade magazine and primary recoater blade to return to a recoater blade magazine starting position upon receipt of the failure signal. The recoater blade magazine and primary recoater blade return to the recoater blade magazine starting position upon receipt of the return command from the controller. A recoater blade disengagement mechanism engages with the primary recoater blade retention mechanism to cause the primary recoater blade to eject from the recoater blade magazine into a recoater blade receptacle. A recoater blade compression mechanism positioned in the recoater blade magazine urges a replacement recoater blade to descend in the recoater blade magazine and to engage with the primary recoater blade retention mechanism, whereby the replacement recoater blade becomes the primary recoater.

The method of the preceding paragraph can optionally include, additionally and/or alternatively, any one or more of the following features, configurations and/or additional elements:

The method of the preceding paragraph, further comprising returning the recoater assembly to operation after the replacement recoater blade becomes the primary recoater.

The method of any of the preceding paragraphs, wherein the optical transmitter is positioned on the recoater blade magazine.

The method of any of the preceding paragraphs, wherein the optical sensor is positioned on an arrestor bulkhead.

The method of any of the preceding paragraphs, wherein the recoater blade disengagement mechanism comprises an arrestor pin positioned on an arrestor bulkhead and wherein the arrestor bulkhead defines the recoater blade magazine starting position.

The method of any of the preceding paragraphs, wherein the recoater blade compression mechanism comprises a spring mechanism.

The method of any of the preceding paragraphs, wherein the optical transmitter is a laser configured to transmit a laser beam.

The method of any of the preceding paragraphs, wherein the optical transmitter is a light emitting diode configured to transmit a columnated light beam.

The method of any of the preceding paragraphs, wherein the AM machine is a laser powder bed AM machine.

The method of any of the preceding paragraphs, wherein the AM machine is an electron beam powder bed AM machine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A recoater assembly for an additive manufacturing (AM) machine comprising:

a recoater blade magazine configured to contain a primary recoater blade and at least one replacement recoater blade, wherein the recoater blade magazine is further configured to traverse across a build powder bed on the AM machine to distribute, with the primary recoater blade, build powder across the build powder bed;

an optical transmitter associated with the recoater blade magazine, wherein the optical transmitter is configured to track a path of the primary recoater blade over the build powder bed;

an optical sensor positioned to receive a light beam transmitted from the optical transmitter as the optical transmitter tracks the path of the primary recoater blade over the build powder bed, wherein if the optical sensor detects that the light beam transmitted from the optical transmitter is obscured or interrupted the optical sensor is configured to generate a failure signal indicating primary recoater blade failure;

a controller configured to receive the failure signal transmitted from the optical sensor to the controller, wherein the controller is configured to command the recoater blade magazine and primary recoater blade to return to a recoater blade magazine starting position;

a recoater blade disengagement mechanism configured to engage with a primary recoater blade retention mechanism to cause the primary recoater blade to eject from the recoater blade magazine into a recoater blade receptacle; and a recoater blade compression mechanism positioned in the recoater blade magazine, wherein the recoater blade compression mechanism is configured to urge a replacement recoater blade to descend in the recoater blade magazine to engage with the primary recoater blade retention mechanism whereby the replacement recoater blade becomes the primary recoater blade.

2. The recoater assembly of claim 1, wherein the optical transmitter is positioned on the recoater blade magazine.

3. The recoater assembly of claim 1, wherein the optical sensor is positioned on an arrestor bulkhead.

4. The recoater assembly of claim 1, wherein the recoater blade disengagement mechanism comprises an arrestor pin positioned on an arrestor bulkhead and wherein the arrestor bulkhead defines the recoater blade magazine starting position.

5. The recoater assembly of claim 1, wherein the recoater blade compression mechanism comprises a spring mechanism.

6. The recoater assembly of claim 1, wherein the optical transmitter is a laser configured to transmit a laser beam.

7. The recoater assembly of claim 1, wherein the optical transmitter is a light emitting diode configured to transmit a columnated light beam.

8. The recoater assembly of claim 1, wherein the AM machine is a laser powder bed AM machine.

9. The recoater assembly of claim 1, wherein the AM machine is an electron beam powder bed AM machine.

10. A method of operating an additive manufacturing (AM) machine having the recoater assembly of claim 1, comprising the steps of:

traversing the recoater assembly across the build powder bed on the AM machine to distribute, with the primary recoater blade positioned in the recoater assembly, build powder across the build powder bed;

tracking, with the optical transmitter associated with the recoater assembly, the path of the primary recoater blade over the build powder bed;

transmitting, by the optical transmitter, the light beam to the optical sensor as the optical transmitter tracks the path of the primary recoater blade over the build powder bed, wherein the optical sensor is configured to generate the failure signal indicating primary recoater blade failure if the optical sensor detects that the light beam transmitted from the optical transmitter is obscured or interrupted;

transmitting, by the optical sensor, the failure signal to the controller, wherein the controller is configured to command the recoater blade magazine and primary recoater blade to return to the recoater blade magazine starting position upon receipt of the failure signal;

returning, the recoater blade magazine and the primary recoater blade, to the recoater blade magazine starting position upon receipt of a return command from the controller;

engaging, by the recoater blade disengagement mechanism, with the primary recoater blade retention mechanism to cause the primary recoater blade to eject from the recoater blade magazine into the recoater blade receptacle; and urging, by the recoater blade compression mechanism positioned in the recoater blade magazine, the replace-ment recoater blade to descend in the recoater blade magazine to engage with the primary recoater blade retention mechanism, whereby the replacement recoater blade becomes the primary recoater blade.

11. The method of operating the AM machine of claim 10, further comprising returning the recoater assembly to operation after the replacement recoater blade becomes the primary recoater blade.

12. The method of operating the AM machine of claim 10, wherein the optical transmitter is positioned on the recoater blade magazine.

13. The method of operating the AM machine of claim 10, wherein the optical sensor is positioned on an arrestor bulkhead.

14. The method of operating the AM machine of claim 10, wherein the recoater blade disengagement mechanism comprises an arrestor pin positioned on an arrestor bulkhead and wherein the arrestor bulkhead defines the recoater blade magazine starting position.

15. The method of operating the AM machine of claim 10, wherein the recoater blade compression mechanism comprises a spring mechanism.

16. The method of operating the AM machine of claim 10, wherein the optical transmitter is a laser configured to transmit a laser beam.

17. The method of operating the AM machine of claim 10, wherein the optical transmitter is a light emitting diode configured to transmit a columnated light beam.

18. The method of operating the AM machine of claim 10, wherein the AM machine is a laser powder bed AM machine.

19. The method of operating the AM machine of claim 10, wherein the AM machine is an electron beam powder bed AM machine.

* * * * *